May 4, 1965   W. C. KUNDE ETAL   3,181,669
ON-OFF INDEXING TYPE SPRING CLUTCH
Filed Nov. 21, 1961
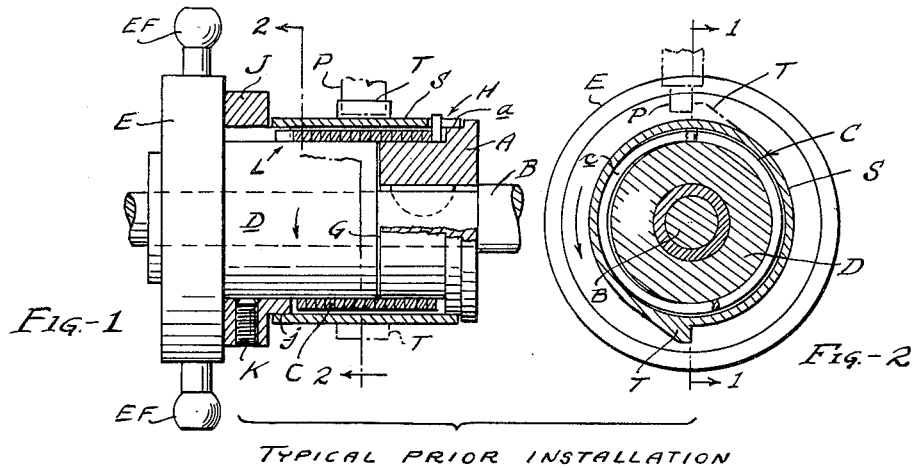
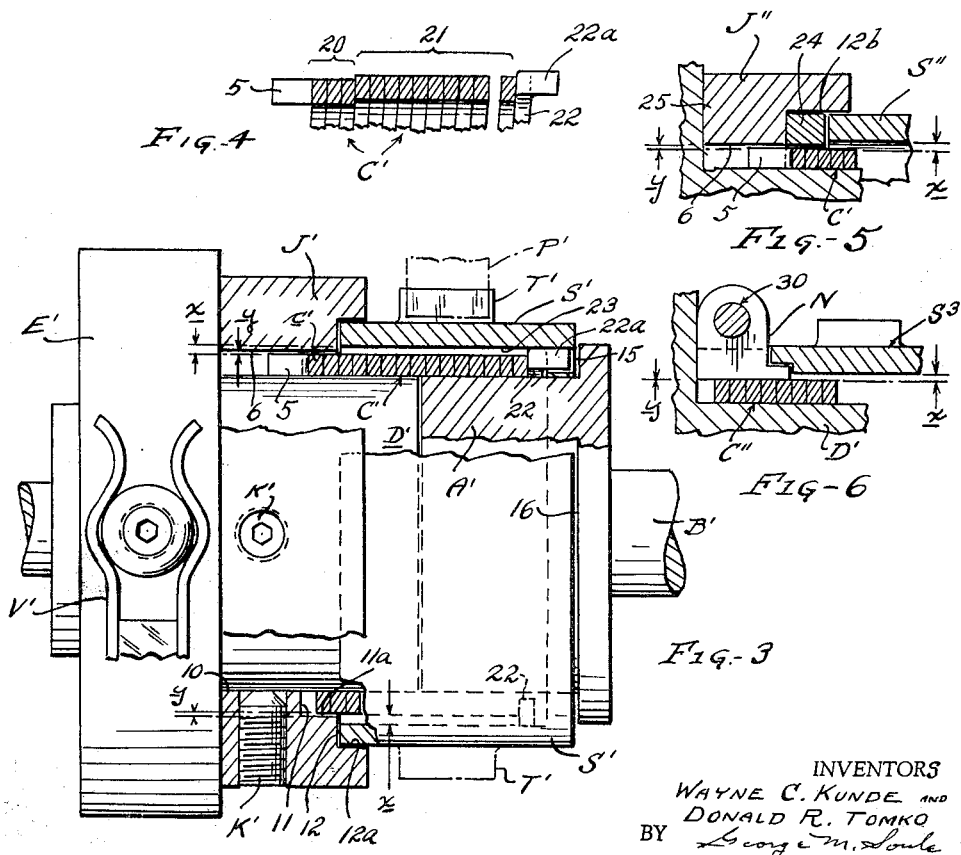
INVENTORS
WAYNE C. KUNDE AND
DONALD R. TOMKO
BY George M. Soule
ATTORNEY United States Patent Office 3,181,669
Patented May 4, 1965

3,181,669
ON-OFF INDEXING TYPE SPRING CLUTCH
Wayne C. Kunde, Lakewood, and Donald R. Tomko, Euclid, Ohio, assignors to Curtiss-Wright Corporation, a corporation of Delaware
Filed Nov. 21, 1961, Ser. No. 154,935
6 Claims. (Cl. 192—81)

The invention relates to a helical friction spring clutch mechanism adapted for use with a continuously rotated drive or input shaft to produce intermittent or cyclical drive of an output or driven mechanism as through operation of an automatic control or actuating means, and more particularly such a clutch mechanism adapted for on-off indexing control.

On-off indexing type clutches using helical springs bridging coaxial input and output clutch drums and self-energizing thereon are commonly in full floating relationship to the continuously rotated input drum, being unconnected therewith except by friction; and actuation or on-off cyclical control is accomplished by the use of a stopping device for a control or release sleeve connected with a free end coil of the spring which is associated with the input drum. The opposite or output-associated end of the helical spring is positively secured to the load as by a toe and slot connection with the output drum. In such on-off indexing type spring clutches the maximum angular movement of the output drum assembly during clutch disengagement is usually limited principally for stopping the output in desired angular positions but sometimes in order to minimize destructive strain on the various coils of the spring during uncoiling thereof and to minimize shock in case the uncoiling is blocked by rigid means. The limiting operation creates special problems which are not involved in the simpler "on-off," normally engaged spring clutches wherein the output-drum-associated coils are in full floating relation to the output drum as well as the input drum (doubly full floating) and the load overruns the spring and can coast to a stop pursuant to suitable disengagement of the clutch.

In many types of service of on-off indexing type spring clutches, when friction contact between output-drum-associated or output end coils of the spring and the control or release sleeve occurs following disengagement, inaccurate or otherwise undesirable operation will result. Probably the most serious consequence is a tendency of the clutch to be self-releasing through binding of an abnormally deflected portion of the output end coil in the control sleeve in a manner to hold the spring in a partially released or uncoiled condition. Permanent deflection of either output or input end coils against the control sleeve will tend to produce wear due to eccentricity as between other coils of the spring and associated clutch drums and can in other ways interfere with uniform or accurate movement of the load into the desired stopped positions.

When the control sleeve, hence the input end of the spring of an indexing type spring clutch arranged as outlined above, is arrested to disengage the clutch and the output-drum-associated coils connected to the load overtravel, thereby uncoiling the spring sufficiently to release the load, the maximum uncoiling tends to occur at the relatively opposite endmost coils involving somewhat more than one half of each since those end portions inherently constitute cantilevers. Cantilever type deflecting movements of the free end coil portions are commonly accepted as inherent in the practical operation of helical clutch springs. The present invention enables cantilever type deflection to be materially reduced or eliminated economically without impairment of general flexibility, sensitivity of control and work capacity. Thus correspondingly greater accuracy in arresting the connected output members in desired angular positions and in adjusting the clutches for variable precise angle stopping is attained.

When an on-off indexing spring clutch according to the present invention is transmitting substantial torque a sufficiently smaller amount of radial clearance between at least one output-associated coil of the spring and a rigid peripheral surface in radially fixed relationship to the working axis of the clutch is maintained than exists between any output-associated coil and the control sleeve. Thereby if desired all or practically all cantilever type deflection of terminal portions of output end coils of the springs during disengagement can be eliminated. When desired similar principles are applicable to reduction of cantilever type deflection at the input ends of the helical clutch springs as will be further explained.

On-off indexing type spring clutches which are required to be extremely accurate in the angular positioning of the output assembly or load following clutch disengagement commonly have an output end coil of the spring secured indirectly to the output drum as by a ring or collar capable of locking the spring in a plurality of different effective positions. Thereby, notwithstanding the practical impossibility of manufacturing a production lot of springs with identical diameters and with terminal portions or "toes" of all the springs in a precise angular relationship to each other, the essential effect thereof for accurate-position-arresting output movement at each operating cycle can be obtained. Two examples of locking collar are illustrated herewith each modified to prevent any output-connected coil of the spring from making contact with the control or release sleeve during disengagement.

Objects and features of the present invention not already indicated will become apparent from the following description of the embodiments shown in the drawing hereof, wherein:

FIGS. 1 and 2 are mutually complementary, small scale views showing in partial elevation and transverse section respectively the essentials of a typical indexing type spring clutch of the prior art having an adjusting collar such as earlier above outlined.

FIG. 3 is an enlarged scale view similar to FIG. 1 showing the present improvement in one form (clutch engaged as in FIG. 1).

FIG. 4 is a detail sectional view of a portion of the preferred clutch spring hereof in relaxed state or before being mounted in its clutch assembly.

FIG. 5 is a fragmentary sectional view similar to part of FIG. 3 and showing a modified construction.

FIG. 6 is a view similar to FIG. 5 showing another modified construction.

In FIGS. 1 and 2 input clutch drum or drum member A, keyed to continuously rotated shaft B, is mounted coaxially with an output drum or drum member D suitably rigid with a load-connected head E. Head E as shown carries spherical cam followers EF two being shown; and the contracting type clutch spring C has coils preloaded on generally cylindrical surfaces of the drums and bridging a narrow crossover gap G between the drums as usual. The arrangements embodying the instant subject improvement (e.g. FIGS. 3 through 6) are to a large extent similar to the "typical prior installation" of FIGS. 1 and 2, and the same characters primed or double-primed are applied to corresponding parts in FIGS. 3 through 6.

The input (right, FIG. 1) end portion of the clutch spring C as shown has a conventional toe and slot connection H with a control sleeve S which surrounds the spring C. Sleeve S is supported coaxially of the drums by cooperation of a circular surface *a* on drum A and a circular surface *j* of an adjusting collar J. The collar J may be secured to turn with the drum D, hence head E, as by one or more set screws K (cf. two screws K' in FIG. 3). The illustrated positive connection L between the output-associated end of the clutch spring C and the output drum involves an axial toe on the spring operatingly mating an axial slot in collar J.

When clutch disengagement occurs (FIG. 1) as when a plunger P is encountered by one of the two illustrated abutments T, the arrested control sleeve S first causes the input end coils of the clutch spring to slide or overrun on the input drum, but then the inertia of the load turns the head E, expanding the clutch spring away from the clutch drums; and recoil or backward turning of the head E can then be suitably prevented as by an anti-reverse latch not shown but well known in the art. Alternatively, as partially shown in FIG. 3 only, a stationary yieldable homing device V', resembling a broom clasp as shown, seizes one of the cam followers EF to assist in arresting and holding the load in the required position and, if necessary, moving the head E further forwardly than it might sometimes be moved solely by inertia. All features of the spring clutch mechanism as thus far described have counterparts or near-counterparts in well known prior art.

In FIG. 3 the adjusting ring or collar J' has a central bore 10 approximately mating the drum D' and two counterbores indicated 11 and 12 whose internal peripheral defining surface portions 11*a* and 12*a* lie in telescoping or surrounding relationship to external peripheral surface portions of the clutch spring C' and the control sleeve S' respectively. To secure the collar J' to the output end of the clutch spring C' the spring has an axial toe 5 in a mating axial slot 6 intersecting bore 10 of the collar. The counterbore surface 12*a* of collar J' serves as a pilot support or journal bearing for the associated end of the control sleve S'. The opposite or input-associated end of the sleeve S' has an internal rib 15, as in United States Patent 2,968,380 issued January 17, 1961 to the assignee hereof (Reissue 25,229, August 21, 1962) occupying a space between the end coil 22 of the clutch spring and an axial shoulder 16 on the input drum member A'. In the on-off indexing control operation of the clutch, when the plunger P' or the like stops rotation of the sleeve S' hence of the clutch spring C', the rib 15 prevents the end coil 22 from rubbing on the still rotating axial shoulder 16.

After trial assembly of the clutch unit of FIG. 3 into the machine to be served, the angular relationship between the stop abutments T' and the homing device V' (or antireverse latch device if used) is adjusted as may be necessary, by resetting the collar J' on the output drum D' while all coils of the spring C' are snugly embracing the two clutch drums but allowing overrun.

Reverting to FIGS. 1 and 2, it can be understood that if the driving direction is according to the arrows (counterclockwise in FIG. 2) and the spring C is a right hand helix, the cantilever portion *c* of the output end coil, FIG. 2, is deflected outwardly toward or into contact with the surrounding control or release sleeve S as the load-connected head E moves angularly through inertia a predetermined amount relative to the arrested toe connection H of the clutch spring and control sleeve assembly. After numerous cycles of operation the coil portion *c* will retain a permanent deflection or distortion with the earlier above described highly undesirable results, particularly when the deflection results in a wedging of the coil portion *c* in outwardly expanded condition during disengagement. A simple solution to the difficulty would appear to be enlarging the internal diameter of the control sleeve S around the output end coil of the spring, but that would not prevent or block eccentric deflection of the end coil, and in the course of time would allow a greater permanent deflection of it, hence wedging and the rest.

As shown in FIG. 3 the counterbore surface 11*a* in the adjusting collar J' provides a narrow radial clearance *y* extending about more than half the circumference of output end coil *c'* of spring C' and which therefore limits such eccentric expansion of the end coil *c* as shown in FIG. 2, hence of all the other output-drum-associated coils. The amount of limitation of deflection within the counterbore 11 is by design and for effectual operation considerably less than the desired normal radial distance (clearance *x*) between the outer diameter surfaces of the various spring coils and the internal diameter surface 23 of the control sleeve S'. As will be shown below, clearance *y* may be zero, but, in the FIG. 3 construction, that would involve impracticable diametrical tolerances (drum D', spring C' and bore 11*a*). The axial depth of the counterbore 11 in ring J' as shown, is sufficient to telescope approximately two coils of the spring, but the depth would be effectual if the counterbore overlapped for example sufficiently more than half of the load-connected free end coil to allow for a slight axial movement of the spring out of position.

In FIG. 4 a group 20 of three coils of the spring C' are shown as though of undersize diameter relative to the remaining uniform diameter coils 21 of the spring. Such stepped diameter coils produce heavier or greater preloading of the clutch spring on the output drum D' than on the input drum A' when the drums are of equal diameters. During disengagement of the clutch constructed with preformed smaller coils as at 20 a greater diametral clearance, especially between the input-drum-associated coils and that drum, per degree of uncoiling movement of the spring, is afforded than when all the coils are of equal diameters. Concomitantly the construction, with a given total number of coils in the spring, results in enabling uncoiling expansion of a lesser number of effective coils for disengagement of the clutch.

The differential preloading just described in reference to FIG. 4 is usually sufficient so that no expansion of any coil of the spring into contact with the internal surface 11*a* of counterbore 11 takes place during clutch disengagement. During the previously described correlation adjustment of stops and (e.g.) anti-reverse latch relationships (as by change of position of collar J') a minimum allowance or calculation for spring-back of output-drum-associated coils has to be made.

If the coil-expansion-limiting collar assembly (e.g., in order to enable special machining or optimum selectivity of materials) is made as suggested at J" FIG. 5 (the rest, optionally, being as described above in connection with FIG. 3), then a ring 24 separate from the collar body 25 can be loosely mounted in the same counterbore 12*b* of such body 25 as pilots the control sleeve S" for free angular movement. The ring 24 can be held loosely in place by axial juxtaposition with the control sleeve S" or can be tight in counterbore 12*b*. Again, as in FIG. 3, the normal clearance *x* is materially greater than clearance *y* between the spring coils and the inner diameter of the ring 24 so that none of the coils can ever touch the interior surface of the control sleeve.

FIG. 6 shows an alternate economical and practical arrangement whereby correlating adjustment of angularity of stops and detents as earlier above described can be easily effected; the clutch spring construction can be simplified by avoiding the provision of a toe or its equivalent on the output end of the spring as well as stepped diameter coils, and the "clearance *y*" can practically be zero, as indicated in FIG. 6. The last would allow corresponding reduction of clearance *x* if desired.

The adjusting sleeve or collar J' of FIG. 3 is replaced in FIG. 6 by a split clamping collar N of generally known form provided with a clamping bolt or screw assembly 30 to enable the collar N to be normally loose around the associated output end coils of the clutch spring C" and to enable accomplishment of effectual anchorage of the output end of the spring to its drum D' by friction as a function of contracting the collar. With the collar N loosened to its normal or relaxed diameter the control sleeve S³ and the output drum D' are relatively moved angularly to proper coordinating positions, causing overrunning of the spring on its drums as may be necessary, and the collar N is then tightly clamped in position via its assembly 30.

Since the coils of the spring C" which underlie the clamping collar N cannot uncoil from the output drum D' during the clutch disengaging operation they behave the same as described above in connection with the heavily preloaded (stepped) coils 20 of FIG. 4 although all the coils corresponding positionally to coils 20 and 21 would, for the FIG. 6 construction, be of equal diameter, hence capable of being made at minimum cost.

Each of the constructions according to FIGS. 3, 5 and 6 can, at the input ends of the clutch springs, be made for example as shown in FIG. 1 or following conventional practice modified as desired for actuation or control purposes.

As shown in FIGS. 3 and 4 the terminal input end coil 22 or the greater part of it (more than half the circumference of a complete coil) is assumed preformed or coiled larger than coils 21 as formed. Also, optionally, the end coil 22 may have an axial toe 22a (or other positive connection means), the toe as shown being received in a cooperating axial eccentric bore in the control sleeve rib portion 15, thereby facilitating the operation of assembling the spring into the control sleeve.

The diametrically enlarged coil 22, if preloaded radially against the circular interior surface 23 of control sleeve S', has a true clutching or snubbing action against said surface during disengagement, thereby tending to protect the toe 22 from torsional strain and shock. The principal purpose of the enlarged diameter of end coil 22 relative to coils 21 however is, via the transitional or gradually expanding coil portion of the spring (not shown) between coil 22 and the next adjacent coil of group 21, to eliminate one sided expansion due to cantilever effect as described above with reference to coil portion c in FIG. 2. Thus during disengagement all the gripping coils 21 are forced to remain concentric with the input drum A; with consequent reduction or minimization of wear and tendency to chatter as compared to conventional spring input end toe and control sleeve construction and operation. Wear-producing radial pressures are shifted to the journal or supporting bearing connection between the control sleeve and the input drum A'.

We claim:

1. An on-off indexing type spring clutch mechanism comprising an input clutch drum adapted to be continuously driven and an output clutch drum coaxial therewith, a helical clutch spring having coil portions resiliently preloaded radially against respective drums and being otherwise unconnected with the input drum and being operatingly connected at the opposite end of the spring to turn with the output drum as though integral therewith, a control sleeve around the spring externally thereof connected thereto at an input-drum-associated end coil of the spring, the connection between the spring and the output drum including a peripheral radially internal surface radially closer to an endmost output-drum-associated coil of the spring than the radial distance between adjacent coils of the spring and the control sleeve, and means operative to stop the control sleeve in a predetermined angular position to disengage the clutch.

2. The clutch mechanism according to claim 1 wherein the operating connection between the helical spring and the output drum includes a collar secured to the output end of the spring and selectively settable on the output drum in various angularly turned positions, and said peripheral internal surface turns with the collar as though integral therewith.

3. The clutch mechanism according to claim 1 wherein the operating connection between the helical spring and the output drum comprises a contractible split ring clamp normally frictionally locking an output end coil against the output drum but releasable to permit angular adjustment of the output drum and the control sleeve.

4. The clutch mechanism according to claim 1 wherein the operating connection between the helical spring and the output drum includes a collar capable of being locked on the output drum to hold said end coil in various angularly turned positions relative to the drum, and said peripheral surface is formed on a substantially rigid ring, the ring and one end of the control sleeve being telescoped by a single counterbore surface on the collar and thereby held substantially coaxial with the output drum.

5. A helical coil clutch mechanism of the type comprising an input clutch drum adapted to be continuously driven unidirecitonally, an output clutch drum coaxial therewith, a helical clutch spring having coils in full floating relationship to the input drum and being preloaded radially against respective drums for self energization thereon, means connecting the axially outermost output end coil of the spring to turn always with the output drum, a control sleeve telescoping output-drum-associated coils of the spring, supported coaxially thereof out of contact therewith and connected to the input-drum-associated end of the spring, the sleeve being thereby adapted to be arrested in a predetermined angular position to disengage the clutch, annular rigid means axially adjacent the control sleeve supported coaxially thereof and extending radially closer to at least the terminal half of said output end coil than any positionally corresponding peripheral surface portion of the control sleeve extends radially toward associated output-drum-telescoping coils of the spring.

6. In a helical coil clutch mechanism of the type comprising an input clutch drum adapted to be continuously driven unidirectionally, an output clutch drum coaxial therewith, a helical clutch spring having coils in full floating relationship to the input drum and being preloaded radially against respective drums for self energization thereon, means connecting the axially outermost output end coil of the spring to turn always with the output drum, a control sleeve telescoping output-drum-associated coils of the spring, supported coaxially thereof out of contact therewith and connected to the input-drum-associated end of the spring, the sleeve being thereby adapted to be arrested in a predetermined angular position to disengage the clutch; the improvement comprising annular rigid means axially adjacent the control sleeve, supported coaxially of the output drum and extending about said output end coil of the spring close thereto radially opposite the associated drum surface for a distance greater than half of one complete coil circumference, said means operating to block substantial radial deflection of said output end coil away from the output drum, thereby restraining deflection of other output-drum-associated coils of the spring radially toward the control sleeve.

References Cited by the Examiner

UNITED STATES PATENTS

| 2,298,970 | 10/42 | Russell et al. | |
| 2,475,432 | 7/49 | Marihart. | |
| 2,551,739 | 5/51 | Harlan. | |
| 2,951,568 | 9/60 | Hungerford et al. | 192—81 |
| 2,968,380 | 1/61 | Sacchini et al. | 192—81 |

FOREIGN PATENTS

| 1,219,738 | 5/60 | France. |

DAVID J. WILLIAMOWSKY, *Primary Examiner.*